United States Patent
Cunningham et al.

(10) Patent No.: US 9,605,587 B2
(45) Date of Patent: Mar. 28, 2017

(54) BOOSTED ENGINE CHARGE AIR COOLER CONDENSATION REDUCTION DEVICE

(71) Applicant: Ford Global Technologies, LLC, Dearborn, MI (US)

(72) Inventors: Ralph Wayne Cunningham, Milan, MI (US); Chris Paul Glugla, Macomb, MI (US); Daniel Joseph Styles, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 835 days.

(21) Appl. No.: 13/693,874

(22) Filed: Dec. 4, 2012

(65) Prior Publication Data

US 2014/0150755 A1 Jun. 5, 2014

(51) Int. Cl.
| | |
|---|---|
| *F02B 29/04* | (2006.01) |
| *F02M 35/10* | (2006.01) |
| *F02M 31/04* | (2006.01) |
| *F02M 31/10* | (2006.01) |
| *F02M 26/06* | (2016.01) |
| *F02M 26/23* | (2016.01) |

(52) U.S. Cl.
CPC ...... *F02B 29/0493* (2013.01); *F02B 29/0425* (2013.01); *F02M 31/042* (2013.01); *F02M 31/10* (2013.01); *F02M 35/1038* (2013.01); *F02B 29/0468* (2013.01); *F02M 26/06* (2016.02); *F02M 26/23* (2016.02); *Y02T 10/126* (2013.01); *Y02T 10/146* (2013.01)

(58) Field of Classification Search
CPC ............. F02B 29/0493; F02B 29/0425; F02B 29/0468; Y02T 10/146; F02M 35/1038; F02M 31/042; F02M 31/10; F02M 25/0727; F02M 25/0709
USPC ......................... 123/563, 41; 60/599, 605.1
See application file for complete search history.

(56) References Cited

U.S. PATENT DOCUMENTS

| | | | |
|---|---|---|---|
| 4,545,333 A | 10/1985 | Nagumo et al. | |
| 5,201,285 A * | 4/1993 | McTaggart | ................. 123/41.31 |
| 7,669,417 B2 * | 3/2010 | Smith | ............................. 60/599 |
| 8,430,068 B2 * | 4/2013 | Harris et al. | ................. 123/41.1 |
| 2001/0000446 A1 | 4/2001 | Mino | |
| 2007/0028902 A1 | 2/2007 | Nigoro et al. | |
| 2007/0204614 A1 * | 9/2007 | Kolb | ..................... F28D 1/0435 60/599 |
| 2009/0050117 A1 * | 2/2009 | Tai | ...................... F02B 29/0412 123/542 |
| 2010/0077995 A1 * | 4/2010 | Buia | .................. F02B 29/0468 123/542 |
| 2011/0005475 A1 * | 1/2011 | Kardos et al. | ............. 123/41.08 |

(Continued)

FOREIGN PATENT DOCUMENTS

WO    WO 2012086181 A1 * 6/2012

*Primary Examiner* — Nicholas J Weiss
*Assistant Examiner* — Paul Thiede
(74) *Attorney, Agent, or Firm* — Julia Voutyras; McCoy Russell LLP

(57) ABSTRACT

Methods and systems are provided for providing auxiliary heat to a charge air cooler to reduce condensate formation. A coolant valve may control the delivery of heated engine coolant to the inlet side of the charge air cooler. The coolant valve may be adjusted based on condensate formation in the charge air cooler and a temperature at the charge air cooler outlet.

20 Claims, 4 Drawing Sheets

(56) References Cited

U.S. PATENT DOCUMENTS

| | | | |
|---|---|---|---|
| 2011/0023796 A1* | 2/2011 | Cattani | F01P 3/12 |
| | | | 123/41.1 |
| 2011/0083648 A1* | 4/2011 | Cattani et al. | 123/568.12 |
| 2013/0019845 A1* | 1/2013 | Meyer | 123/542 |
| 2013/0269663 A1* | 10/2013 | Nishiyama et al. | 123/568.12 |
| 2014/0109846 A1* | 4/2014 | Styles et al. | 123/41.12 |
| 2014/0109880 A1* | 4/2014 | Styles et al. | 123/542 |
| 2014/0110488 A1* | 4/2014 | Surnilla et al. | 236/49.1 |
| 2014/0120820 A1* | 5/2014 | Glugla et al. | 454/75 |
| 2014/0123963 A1* | 5/2014 | Glugla et al. | 123/542 |

* cited by examiner

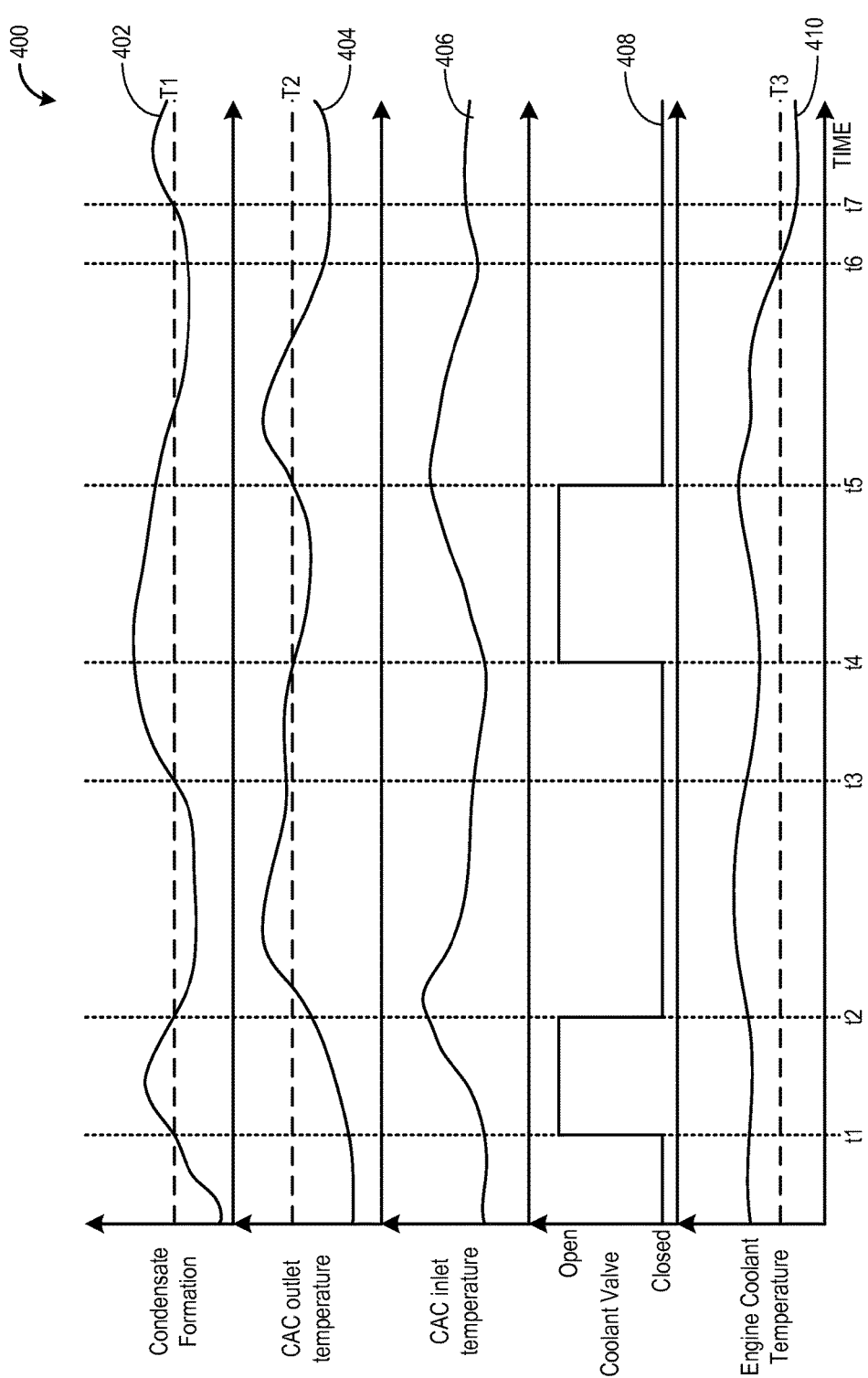

BOOSTED ENGINE CHARGE AIR COOLER CONDENSATION REDUCTION DEVICE

BACKGROUND/SUMMARY

Turbo charged engines utilize a Charge Air Cooler (CAC) to cool compressed air from the turbocharger, before it enters the engine. Ambient air from outside the vehicle, or coolant, travels across the CAC to cool intake air passing through the inside of the CAC. Condensate may form in the CAC when the ambient air temperature decreases, or during humid or rainy weather conditions, where the charge air is cooled below the water dew point. When the intake air includes recirculated exhaust gasses, the condensate can become acidic and corrode the CAC housing. The corrosion can lead to leaks between the air charge, the atmosphere, and possibly the coolant in the case of water-to-air coolers. Condensate may collect at the bottom of the CAC, and then be drawn into the engine at once during acceleration (or tip-in) increasing the chance of engine misfire.

Other attempts to address condensate formation include restricting ambient air flow to the CAC to decrease cooling efficiency. However, decreasing cooling to the CAC may also decrease cooling to other engine components. Another method to reduce engine misfire due to condensate ingestion includes trapping and/or draining the condensate from the CAC. While this may reduce condensate levels in the CAC, condensate is moved to an alternate location or reservoir, which may be subject to other issues such as freezing and corrosion.

In one example, the issues described above may be addressed by a method for adjusting heating to a charge air inlet side of a CAC in response to an operating condition. The operating condition may include one or more condensate formation conditions in the CAC. Heating to the inlet side of the CAC may be increased in response to increased condensate formation. In this way, the temperature of the charge air traveling through the CAC may increase, reducing condensate formation.

As one example, a coolant valve may be adjusted to deliver heated engine coolant to the charge air inlet side of the CAC in response to condensate formation conditions in the CAC and/or a CAC outlet temperature. For example, when the coolant valve is opened, heated engine coolant may be delivered to the inlet side of the CAC, increasing the temperature of the charge air entering the CAC. Alternatively, when the coolant valve is closed, heated engine coolant may not be delivered to the inlet side of the CAC. In one example, the coolant valve may be opened when CAC outlet temperature is less than a threshold temperature. In another example, the coolant valve may be closed when condensate formation is below the threshold and/or CAC outlet temperature is greater than the threshold temperature. The threshold temperature may be based on a threshold for engine knock so as to reduce the potential for increasing engine knock by cooling intake air less and/or heating intake air. In this way, condensate formation may be decreased while maintaining relatively efficient engine operation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4 shows a graphical example of adjustments to a coolant valve based on condensate formation in a CAC and CAC outlet temperature.

DETAILED DESCRIPTION

The following description relates to systems and methods for providing heat to a charge air inlet side of a charge air cooler (CAC) to reduce condensate formation. Heating to the charge air inlet side of the CAC in an engine system, such as the engine system of FIG. 1, may be adjusted in response to condensate formation in the CAC. In one example, adjusting heating may include adjusting the delivery rate of heated engine coolant to the inlet side of the CAC. A method for adjusting the delivery of heated engine coolant to the CAC, based on condensate formation and CAC outlet temperature, is shown at FIG. 2. A coolant valve may be adjusted in response to increased or decreased condensate formation. Condensate formation may include an amount of condensate formation, as determined by a method presented at FIG. 3. FIG. 4 illustrates example adjustments to the coolant valve in response to condensate formation and CAC outlet temperature.

Figure 1:
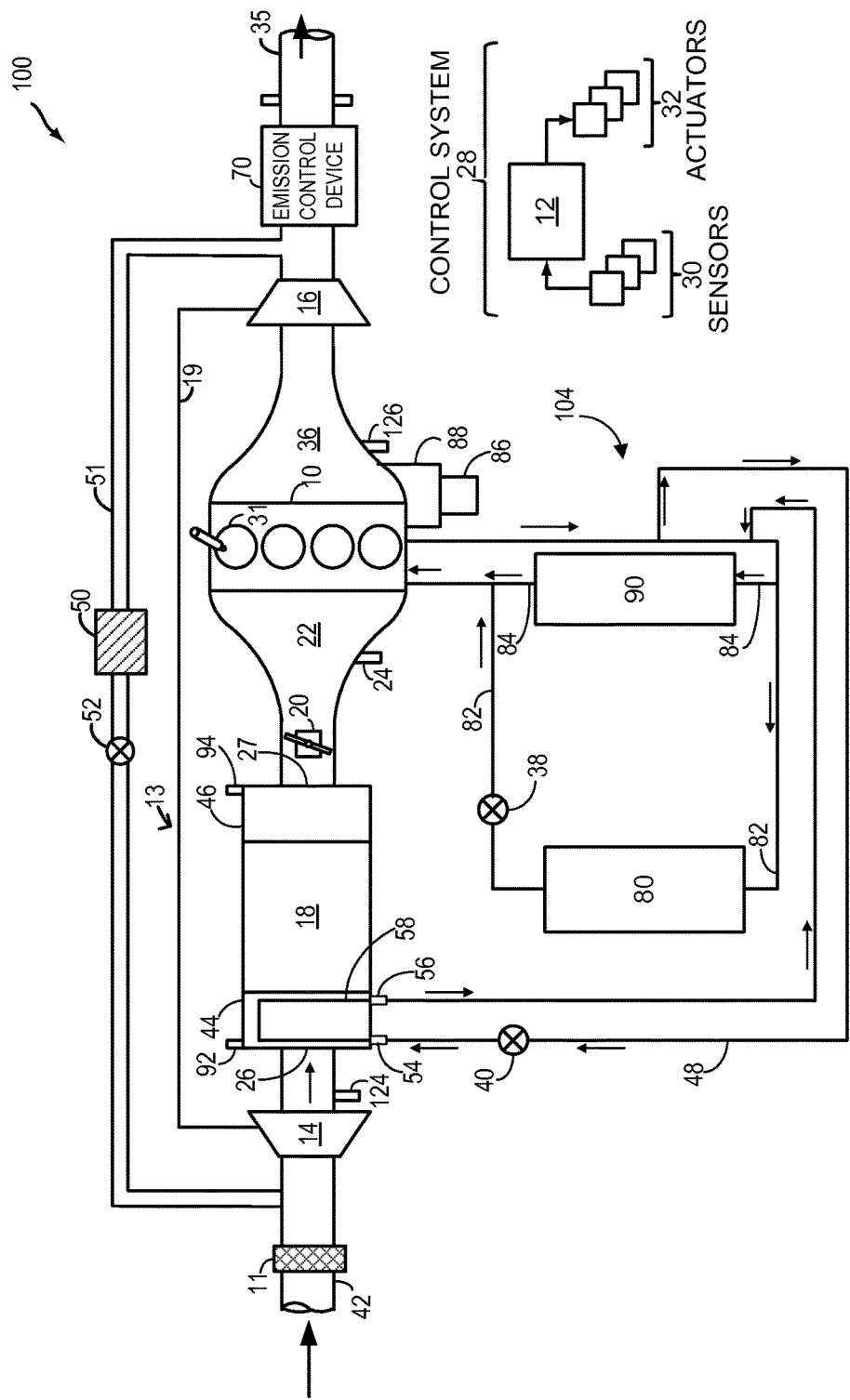
FIG. 1 is a schematic diagram of an example engine system including a charge air cooler and a cooling system.
Figure 2:
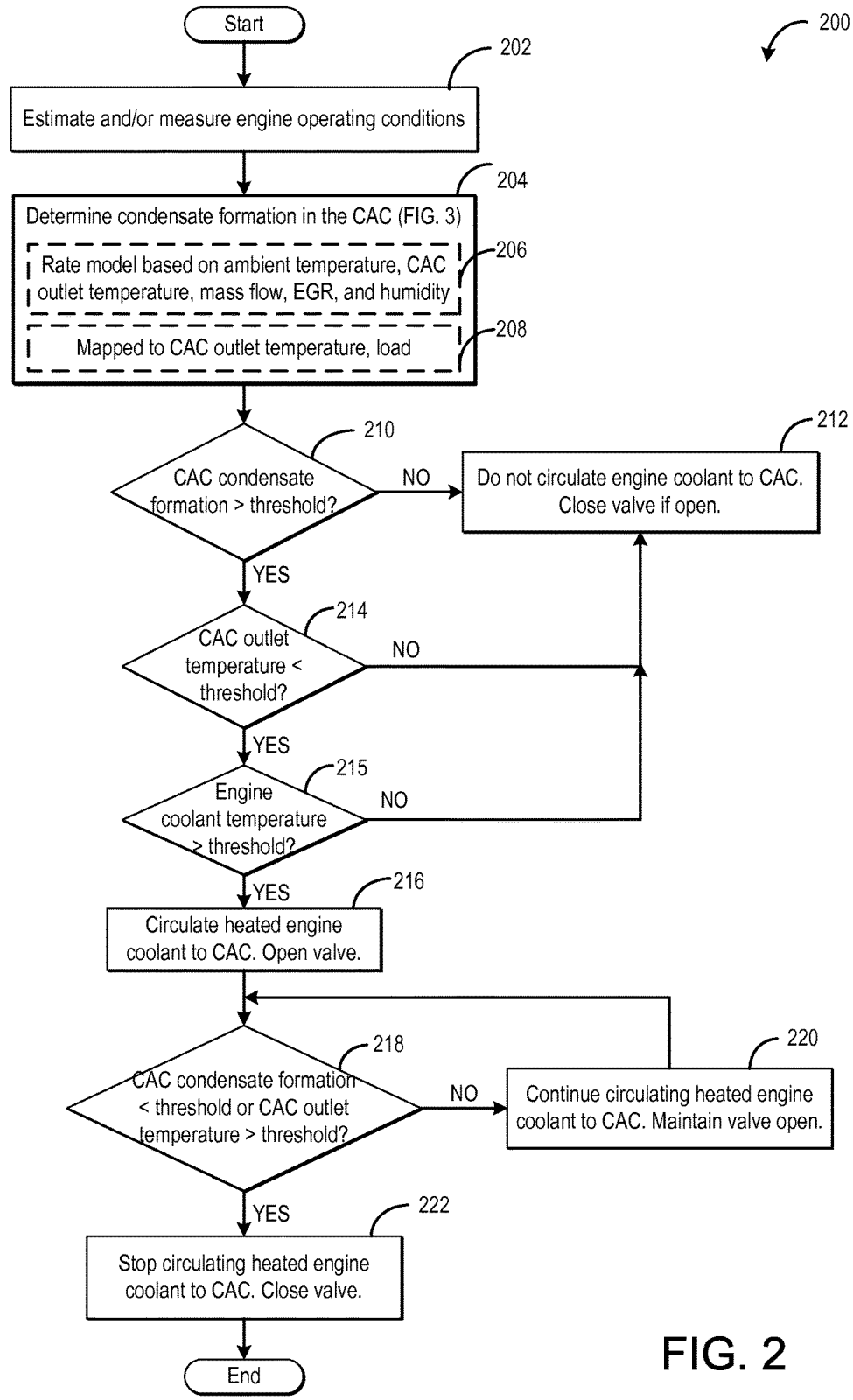
FIG. 2 shows a flow chart of a method for adjusting the delivery of engine coolant to the charge air inlet side of a CAC.

FIG. 1 shows an example embodiment of an engine system 100, in a motor vehicle, illustrated schematically. Engine system 100 may be included in a vehicle such as a road vehicle, among other types of vehicles. While the example applications of engine system 100 will be described with reference to a vehicle, it should be appreciated that various types of engines and vehicle propulsion systems may be used, including passenger cars, trucks, etc.

In the depicted embodiment, engine 10 is a boosted engine coupled to a turbocharger 13 including a compressor 14 driven by a turbine 16. Specifically, fresh air is introduced along intake passage 42 into engine 10 via air cleaner 11 and flows to compressor 14. The compressor may be a suitable intake-air compressor, such as a motor-driven or driveshaft driven supercharger compressor. In the engine system 100, the compressor is shown as a turbocharger compressor mechanically coupled to turbine 16 via a shaft 19, the turbine 16 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed and other operating conditions.

As shown in FIG. 1, compressor 14 is coupled, through charge air cooler (CAC) 18 to throttle valve 20. The CAC may be an air-to-air or air-to-water heat exchanger, for example. Throttle valve 20 is coupled to engine intake manifold 22. From the compressor, the hot compressed air charge enters the charge air inlet 26 of the CAC 18, cools as it travels through the CAC, and then exits the charge air outlet 27 to pass through the throttle valve to the intake manifold. Ambient air flow from outside the vehicle may enter engine 10 through a vehicle front end and pass across the CAC, to aid in cooling the charge air. Condensate may form and accumulate in the CAC when the ambient air temperature decreases, or during humid or rainy weather conditions, where the charge air is cooled below the water dew point. When the charge air includes recirculated exhaust gasses, the condensate can become acidic and corrode the CAC housing. The corrosion can lead to leaks between the air charge, the atmosphere, and possibly the coolant in the case of water-to-air coolers. Additionally, condensate may collect at the bottom of the CAC, and then be drawn into the engine at once during acceleration (or tip-in) increasing the chance of engine misfire. Thus, as elaborated herein with reference to FIGS. 2-4, the temperature at the CAC inlet may be controlled such that condensate formation and engine misfire events are reduced.

In the embodiment shown in FIG. 1, the pressure of the air charge within the intake manifold is sensed by manifold air pressure (MAP) sensor 24 and a boost pressure is sensed by boost pressure sensor 124. A compressor by-pass valve (not shown) may be coupled in series between the inlet and the outlet of compressor 14. The compressor by-pass valve may be a normally closed valve configured to open under selected operating conditions to relieve excess boost pressure. For example, the compressor by-pass valve may be opened during conditions of decreasing engine speed to avert compressor surge.

Intake manifold 22 is coupled to a series of combustion chambers 31 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold section may enable effluent from different combustion chambers to be directed to different locations in the engine system. Universal Exhaust Gas Oxygen (UEGO) sensor 126 is shown coupled to exhaust manifold 36 upstream of turbine 16. Alternatively, a two-state exhaust gas oxygen sensor may be substituted for UEGO sensor 126.

As shown in FIG. 1, exhaust from the one or more exhaust manifold sections is directed to turbine 16 to drive the turbine. When reduced turbine torque is desired, some exhaust may be directed instead through a waste gate (not shown), by-passing the turbine. The combined flow from the turbine and the waste gate then flows through emission control device 70. In general, one or more emission control devices 70 may include one or more exhaust after-treatment catalysts configured to catalytically treat the exhaust flow, and thereby reduce an amount of one or more substances in the exhaust flow.

All or part of the treated exhaust from emission control device 70 may be released into the atmosphere via exhaust conduit 35. Depending on operating conditions, however, some exhaust may be diverted instead to EGR passage 51, through EGR cooler 50 and EGR valve 52, to the inlet of compressor 14. In this manner, the compressor is configured to admit exhaust tapped from downstream of turbine 16. The EGR valve may be opened to admit a controlled amount of cooled exhaust gas to the compressor inlet for desirable combustion and emissions-control performance. In this way, engine system 100 is adapted to provide external, low-pressure (LP) EGR. The rotation of the compressor, in addition to the relatively long LP EGR flow path in engine system 100, provides excellent homogenization of the exhaust gas into the intake air charge. Further, the disposition of EGR take-off and mixing points provides effective cooling of the exhaust gas for increased available EGR mass and improved performance.

Engine system 100 further includes a cooling system 104 that circulates coolant through internal combustion engine 10 to absorb waste heat and distributes the heated coolant to radiator 80, heater core 90, and/or CAC 18 via coolant lines 82, 84, and 48, respectively. In particular, FIG. 1 shows cooling system 104 coupled to engine 10 and circulating engine coolant from engine 10 to radiator 80 via engine-driven water pump 86, and back to engine 10 via coolant line 82. Engine-driven water pump 86 may be coupled to the engine via front end accessory drive (FEAD) 88, and rotated proportionally to engine speed via belt, chain, etc. Specifically, engine-driven water pump 86 circulates coolant through passages in the engine block, head, etc., to absorb engine heat, which is then transferred via the radiator 80 to ambient air. In an example where engine-driven water pump 86 is a centrifugal pump, the pressure (and resulting flow) produced may be proportional to the crankshaft speed, which in the example of FIG. 1, is directly proportional to engine speed. In another example, a motor-controlled pump may be used that can be adjusted independently of engine rotation. The temperature of the coolant may be regulated by a thermostat valve 38, located in the cooling line 82, which may be kept closed until the coolant reaches a threshold temperature. Coolant may flow through coolant line 82, as described above, and/or through coolant line 84 to heater core 90 where the heat may be transferred to a passenger compartment, and the coolant flows back to engine 10. In some examples, engine-driven water pump 86 may operate to circulate the coolant through coolant lines 82, 84, and 48.

Heated engine coolant may further be delivered from the engine to the charge air inlet side 44 of the CAC 18 via coolant line 48. A coolant valve 40 may control the flow of heated engine coolant to the charge air inlet side (e.g., inlet side) of the CAC. For example, when coolant valve 40 is open, heated engine coolant may flow through coolant line 48 and be delivered to the charge air inlet side of the charge air cooler through coolant inlet port 54. Heated coolant may then flow through CAC coolant line segment 58, running through the charge air inlet side of the CAC. Heat may be exchanged between CAC coolant line segment 58 and the charge air entering the CAC at charge air inlet side 44. Engine coolant may then exit the charge air inlet side of the CAC through coolant exit port 56 and then return via coolant line 48 to the coolant flow of cooling system 104.

In this way, heat may be transferred from heated engine coolant to the incoming charge air, increasing the temperature of the charge air entering the charge air inlet side of the CAC. By increasing the temperature of the charge air entering the CAC, the charge air passing through the CAC may remain above the dew point temperature. As such, condensate formation may be reduced. For example, by increasing the charge air temperature at the inlet side of the CAC (e.g., CAC inlet temperature), the charge air temperature at the charge air outlet side 46 of the CAC (e.g., CAC outlet temperature) may be increased. If the CAC outlet temperature is maintained above the dew point temperature, condensate formation in the CAC may be reduced. The CAC inlet temperature and outlet temperature may be monitored by an inlet temperature sensor 92 and outlet temperature sensor 94, respectively.

FIG. 1 further shows a control system 28. Control system 28 may be communicatively coupled to various components of engine system 100 to carry out the control routines and actions described herein. For example, as shown in FIG. 1, control system 28 may include an electronic digital controller 12. Controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors 30, which may include user inputs and/or sensors (such as transmission gear position, gas pedal input, brake input, transmission selector position, vehicle speed, engine speed, mass airflow through the engine, boost pressure, ambient temperature, ambient humidity, intake air temperature, fan speed, etc.), cooling system sensors (such as coolant temperature, passenger compartment temperature, ambient humidity, etc.), CAC 18 sensors (such as CAC inlet air temperature and pressure, CAC outlet air temperature and pressure, etc.), and others.

In some embodiments, controller 12 may receive data from a GPS and/or an in-vehicle communications and entertainment system of the vehicle (not shown). The in-vehicle communications and entertainment system may communicate with a wireless communication device via various wireless protocols, such as wireless networks, cell tower transmissions, and/or combinations thereof. Data obtained from the in-vehicle communications and entertainment system may include real-time and forecasted weather conditions. Weather conditions, such as temperature, precipitation (e.g., rain, snow, hail, etc.), and humidity, may be obtained through various wireless communication device applications and weather-forecasting websites. Data obtained from the in-vehicle communications and entertainment system may include current and predicted weather conditions for the current location, as well as future locations along a planned travel route. In one example, the wireless communication device may relay real-time humidity data to the in-vehicle communications and entertainment system, and/or GPS, which is then relayed to the controller 12. The controller 12 may use humidity and precipitation date to predict and/or calculate condensate formation in the CAC. As such, the controller may then use predicted condensate formation to control heating to the CAC inlet to reduce condensate formation. For example, the controller may use the above data to control delivery of heated engine coolant to the inlet side of the CAC.

In other embodiments, the presence of rain and/or high humidity may be inferred from other signals or sensors (e.g., rain sensors). In one example, rain may be inferred from a vehicle windshield wiper on/off signal. Specially, in one example, when the windshield wipers are on, a signal may be sent to controller 12 to indicate rain. The controller may use this information to predict the likelihood of condensate formation in the CAC and adjust vehicle actuators, such as heating to the inlet side of the CAC. Adjustments to CAC heating are described in more detail below with reference to FIGS. 2-4.

Furthermore, controller 12 may communicate with various actuators 32, which may include engine actuators (such as fuel injectors, an electronically controlled intake air throttle plate, spark plugs, etc.), cooling system actuators (such as air handling vents and/or diverter valves in the passenger compartment climate control system, etc.), and others. In some examples, the storage medium may be programmed with computer readable data representing instructions executable by the processor for performing the methods described below as well as other variants that are anticipated but not specifically listed.

As noted herein, the amount of waste heat transferred to the coolant from the engine may vary with operating conditions, thereby affecting the amount of heat transferred to the charge air entering the CAC. For example, as engine output torque or fuel flow is reduced, the amount of waste heat generated may be proportionally reduced. As such, the temperature of the coolant leaving the engine may be lower. As a result, if this less heated engine coolant enters coolant line 48 to the CAC, less heating may be provided to the charge air inlet side of the CAC. Thus, in one example, condensate formation may decrease at a slower rate. In one embodiment, if the engine coolant temperature is less than a threshold coolant temperature, the coolant valve may remain closed even if conditions for opening the valve are met. For example, the threshold coolant temperature may be a temperature at or below the charge air temperature exiting the compressor and entering the CAC. In this example, heat may be transferred to the coolant from the charge air, decreasing the temperature of the charge air. In this way, flow of engine coolant to the charge air inlet side of the CAC may increase when engine coolant temperature is above a threshold coolant temperature and may not increase when engine coolant temperature is below the threshold coolant temperature.

As described above, condensate formation in a CAC may be reduced by increasing the charge air temperature at the charge air inlet side of the CAC. The charge air temperature may be increased by providing auxiliary heat to the charge air inlet end (e.g., inlet side) of the CAC. Heating the charge air inlet side of the CAC may be adjusted in response to an operating condition, including one or more condensate formation conditions. Condensate formation conditions may include an amount of condensate in the CAC and/or a rate of condensate formation. Condensate formation conditions may also include increased ambient humidity, decreased ambient temperature, increased pressure in the CAC, and increased potential for condensate formation as determined by ambient conditions, rain sensors, and/or data from a GPS and/or an in-vehicle communications and entertainment system. Further details on determining condensate formation are described below with regard to FIGS. 2-3.

In one example, heating the charge air inlet side of the CAC may increase in response to increased condensate formation. Heating may be further controlled in response to the temperature and pressure at the charge air outlet side of the CAC (e.g., CAC outlet temperature and pressure). For example, heating the charge air inlet side of the CAC may decrease in response to the temperature at the charge air outlet side of the CAC reaching a threshold temperature. In one example, reaching the threshold temperature includes increasing up to or beyond the threshold temperature. The purpose of the CAC is to cool charge air before it enters the engine cylinders for combustion. If the charge air is not adequately cooled, engine knock may occur. Thus, the threshold temperature may be based on engine knock. For example, if the temperature of the charge air at the CAC outlet is higher than the threshold temperature, engine knock may occur. The threshold temperature may be set such that the heating is limited to avoid the potential for engine knock at the current spark timing settings. The threshold temperature based on engine knock may further be based on charge air temperature, humidity, and manifold temperature. In this way, a controller may control the heat supplied to the charge air inlet side of the CAC in response to CAC outlet temperature and condensate formation in the CAC.

In one embodiment, the controller may control heating to the inlet side of the CAC in response to CAC outlet temperature alone. For example, heat may be supplied to the charge air inlet side of the CAC when the CAC outlet temperature is within a threshold range. The lower threshold in the threshold range may be a dew point temperature. As such, heating may increase when the charge air temperature at the CAC outlet is less than the dew point temperature. The higher threshold in the threshold range may be the threshold temperature for engine knock. As such, heating may decrease when the charge air temperature at the CAC outlet is greater than the threshold temperature. In this way, the CAC outlet temperature may be maintained above the dew point temperature to reduce condensate formation and below the threshold temperature to reduce engine knock.

In one example, heat to the charge air inlet side of the CAC may be provided by heated engine coolant. As described above, heated engine coolant may be delivered to the inlet side of the CAC where heat may transfer from the coolant to the incoming charge air. In one example, the delivery rate of engine coolant to the charge air inlet side of the CAC may be controlled by adjusting the position of a coolant valve. As such, increasing the opening of the coolant valve may increase the delivery rate of engine coolant to the inlet side of the CAC and decreasing the opening of the coolant valve may decrease the delivery of engine coolant to the inlet side of the CAC. In another example, the controller may adjust a coolant valve open to deliver heated engine coolant to the CAC. The same coolant valve may be closed to stop delivery of the heated engine coolant to the CAC. The length of time that the coolant valve is open or closed may depend on the temperature of the heated engine coolant, the incoming charge air temperature, condensate formation, and the CAC outlet temperature. For example, the coolant valve may be open longer when the engine coolant temperature is lower and/or the incoming charge air temperature is lower. In another example, the coolant valve may be open for a shorter amount of time when the incoming charge air temperature is higher and consequently the CAC outlet temperature is higher.

Further, the coolant valve may be controlled responsive to an air mass flow rate through the CAC (e.g., flow rate of charge air traveling through the CAC). For example, the coolant valve may be closed when the air mass flow rate through the CAC is higher than a threshold rate. When the air mass flow rate through the CAC is higher than the threshold rate, condensate may not adhere to the internal passages of the CAC and collect in the CAC. As such, condensate may be purged from the CAC during this time and reducing condensate formation may not be necessary. Further, controlling delivery of heated engine coolant in this way may reduce engine knock. Higher air mass flow rates may occur during high torque and power demand conditions, when cooler inlet air charge temperatures may aid in reducing engine knock. For example, during a tip-in, air mass flow may increase above the threshold rate, stripping condensate from the CAC. In this example, the coolant valve may be closed to increase the temperature of the charge air and reduce engine knock. In this way, the coolant valve may be closed when the air mass flow rate through the CAC is higher than the threshold rate. As such, the threshold rate may be based on the air mass flow rate which overcomes an internal surface tension of condensate and strips condensate from the internal passages of the CAC.

In an alternate embodiment, heat to the inlet side of the CAC may be provided by an electric heat source. The electric heat source, such as an electric heater, may be controlled in response to condensate formation and CAC outlet temperature. For example, the controller may turn on the electric heat source to increase heating to the inlet side of the CAC and reduce condensate formation. In another example, the controller may turn off the electric heat source to decrease heating to the inlet side of the CAC. Though the electric heat source may not increase engine efficiency, it may be used to heat other engine components. For example, the electric heat source may be used to reduce throttling losses and icing of engine components. In this way, heating to the charge air inlet side of the CAC may be adjusted by adjusting electric heat source operation.

In this way, heating to a charge air inlet side of a CAC may be adjusted in response to condensate formation in the CAC. Heating may further be adjusted in response to a charge air temperature at the charge air outlet side of the CAC. Adjusting heating may include increasing heating in response to increased condensate formation and decreasing heating in response to the temperature at the charge air outlet side of the charge air cooler outlet reaching a threshold temperature. In one example, adjusting heating may include adjusting the delivery rate of engine coolant to the charge air inlet side of the CAC.

Turning now to FIG. 2, an example method 200 for adjusting delivery of engine coolant to the charge air inlet side (e.g., inlet side) of a CAC is shown. A coolant valve along a coolant line carrying heated engine coolant may be controlled responsive to conditions of the CAC. Condensate formation in the CAC and charge air temperature at the outlet of the CAC may determine the position of the coolant valve and whether or not engine coolant is circulated to the CAC.

At 202, method 200 includes estimating and/or measuring engine operating conditions. These may include engine speed and load, engine coolant temperature, boost level, conditions of the CAC (e.g., inlet and outlet temperature, inlet and outlet pressure), ambient temperature and pressure, and MAP. An amount or level of condensate in the CAC may be determined based on this data at 204. In one example, at 206, and as further elaborated at the model at FIG. 3, a rate of condensate formation within the CAC may be based on ambient temperature, CAC outlet temperature and pressure, air mass flow, EGR, and humidity. This may then be used to calculate the amount or level of condensate in the CAC. In another example, at 208, a condensation formation value may be mapped to CAC outlet temperature and a ratio of CAC pressure to ambient pressure. In an alternate example, the condensation formation value may be mapped to CAC outlet temperature and engine load. Engine load may be a function of air mass, torque, accelerator pedal position, and throttle position, and thus may provide an indication of the air flow velocity through the CAC. For example, a moderate engine load combined with a relatively cool CAC outlet temperature may indicate a high condensation formation value, due to the cool surfaces of the CAC and relatively low intake air flow velocity. The map may further include a modifier for ambient temperature.

Returning to FIG. 2, at 210 the routine determines if condensate formation in the CAC is greater than a threshold. In one example, the threshold may be a threshold amount of condensate. In another example, the threshold may be a threshold rate of condensate formation. In one example, the threshold rate of condensate formation may be set to zero, or a relatively small value, so condensate formation may be further reduced. In yet another example, the threshold may be based on predicted condensate formation. For example, if rain or humidity sensors indicate high humidity, increased condensate formation may be predicted and used to control the coolant valve. Additionally, the potential for condensate formation may be determined at 204. Increased potential for condensate formation may be determined by ambient conditions (e.g., temperature and humidity), rain sensors, and/or data from a GPS and/or an in-vehicle communications and entertainment system. If condensate formation is not greater than the threshold, engine coolant is not circulated to the inlet side of the CAC. If the coolant valve is open, the routine closes the coolant valve at 212, otherwise the coolant valve remains closed. However, if condensate formation is greater than the threshold at 210, the routine continues on to 214 to determine if the CAC outlet temperature is less than a threshold temperature. As discussed above, the threshold temperature may be based on a threshold for engine knock. In this way, the threshold temperature may be the maximum temperature for stable combustion at the current spark timing settings. If the temperature of the charge air at the outlet side of the CAC is greater than the threshold temperature, engine coolant is not circulated to the charge air inlet side of the CAC. If the coolant valve is open, the routine closes the coolant valve at 212, otherwise the coolant valve may remain closed. However, if the CAC outlet temperature is less than the threshold temperature, the routine continues on to determine engine coolant temperature in relation to a threshold coolant temperature.

At 215, the routine determines if the engine coolant temperature exiting the engine is greater than a threshold coolant temperature. The threshold coolant temperature may be based on the temperature of the charge air entering the charge air inlet of the CAC. For example, the threshold coolant temperature may be a temperature at or above the temperature of the charge air entering the CAC. As such, the threshold coolant temperature may be the minimum coolant temperature than may still transfer heat to the charge air and increase the temperature of the charge air. If the engine coolant temperature is not greater than the threshold coolant temperature, engine coolant is not circulated to the charge air inlet side of the CAC. If the coolant valve is open, the routine closes the coolant valve at 212, otherwise the coolant valve may remain closed. However, if the temperature of the engine coolant is greater than the threshold coolant temperature, the controller may circulate the heated engine coolant to the CAC by opening the coolant valve at 216.

At 218, the routine determines if CAC condensate formation is less than a threshold or CAC outlet temperature is greater than a threshold temperature. If neither of these conditions are met, the coolant valve is maintained open at 220 to continue circulating heated engine coolant to the CAC. When one or both of the conditions at 218 are met, the controller may close the coolant valve at 222 to stop circulating heated coolant to the inlet side of the CAC.

In this way, a coolant valve may be adjusted to control delivery of heated engine coolant to the inlet side of the CAC in response to condensate formation in the CAC and CAC outlet temperature. In one example, flow of engine coolant to a charge air inlet side of a CAC may be increased responsive to increased potential for condensate formation during engine coolant temperature above a threshold coolant temperature. In another example, flow of engine coolant to the charge air inlet side of the CAC may not be increased during engine coolant temperature below the threshold coolant temperature. The coolant valve may be adjusted to fully open to increase the flow and maintained fully closed to not increase the flow.

In one example, the coolant valve is opened when condensate formation is greater than a threshold and charge air cooler outlet temperature is less than a threshold. In another example, the coolant valve is closed when one or more of condensate formation is less than a threshold and charge air cooler outlet temperature is greater than a threshold temperature. As such, adjusting the coolant valve to deliver heated coolant to the CAC may reduce CAC condensate formation and engine misfire.

Figure 3:
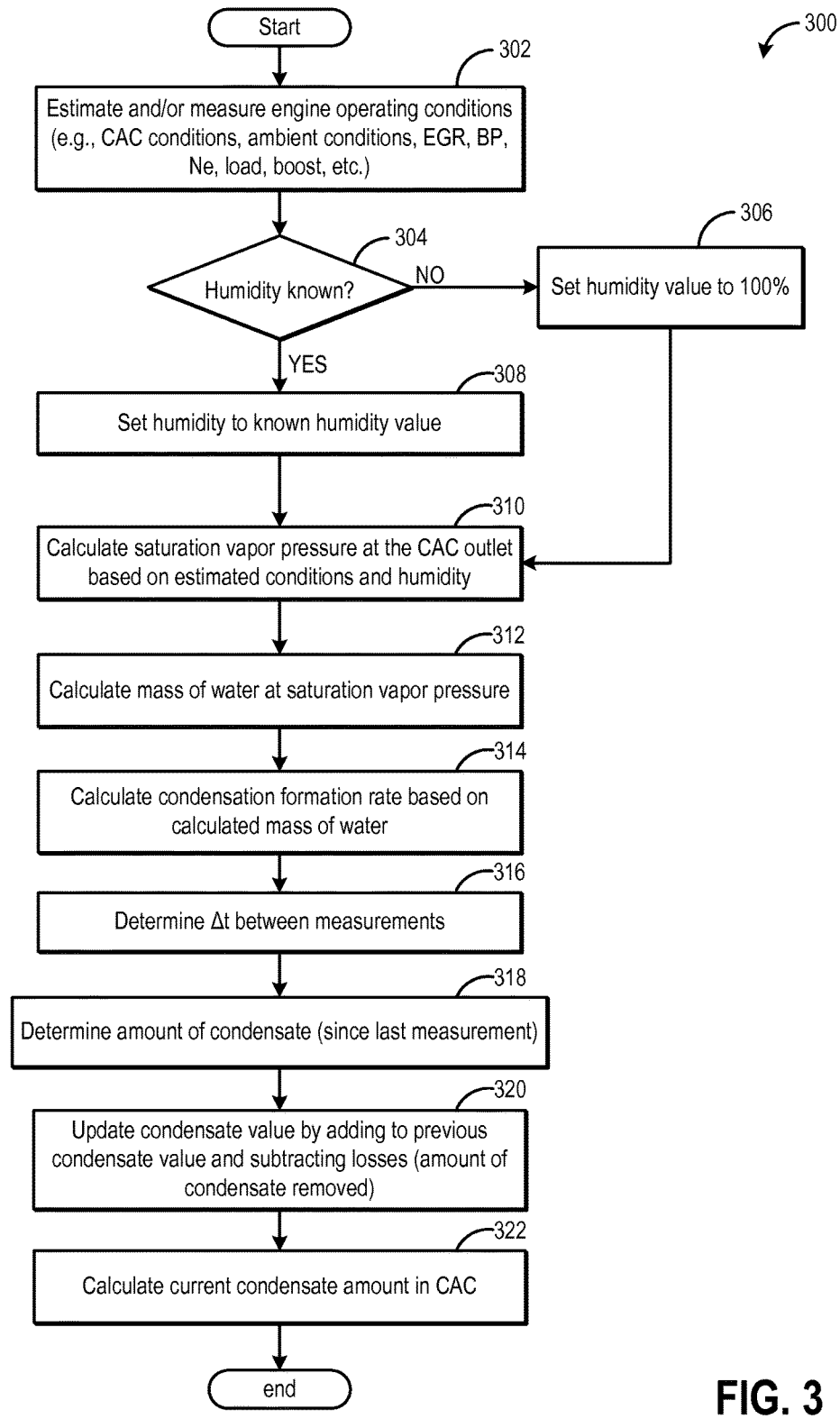
FIG. 3 shows a flow chart illustrating a method for determining the amount of condensate within a CAC according to an embodiment of the present disclosure.

FIG. 3 illustrates a method 300 for estimating the amount of condensate stored within a CAC. Based on the amount of condensate at the CAC relative to a threshold value, a coolant valve may be adjusted to circulate heated engine coolant to the inlet side of the CAC.

The method begins at 302 by determining the engine operating conditions. These may include, as elaborated previously at 202, ambient conditions, CAC conditions (inlet and outlet temperatures and pressures, flow rate through the CAC, etc.), mass air flow, MAP, EGR flow, engine speed and load, engine temperature, boost, ambient pressure, etc. Next, at 304, the routine determines if the ambient humidity (humidity) is known. In one example, the ambient humidity may be known based on the output of a humidity sensor coupled to the engine. In another example, humidity may be inferred from a downstream UEGO sensor or obtained from infotronics (e.g., internet connections, a vehicle navigation system, etc.) or a rain/wiper sensor signal. If the humidity is not known (for example, if the engine does not include a humidity sensor), the humidity may be set at 306 to 100%. In an alternate embodiment, the humidity may be estimated based on inferred conditions, such as CAC efficiency and windshield wiper speed. However, if the humidity is known, the known humidity value, as provided by a humidity sensor, may be used as the humidity setting at 308.

The ambient temperature, pressure, and humidity may be used to determine the dew point of the intake air, which may be further affected by the amount of EGR in the intake air (e.g., EGR may have a different humidity and temperature than the air from the atmosphere) and the pressure ratio of the CAC pressure to the ambient pressure. The difference between the dew point, the pressure ratio of the CAC to the ambient pressure, and the CAC outlet temperature indicates whether condensation will form within the cooler, and the mass air flow may affect how much condensation actually accumulates within the cooler. Additionally, the internal design of the CAC may characterized and determine the amount of condensate that stays entrained in the air flow, and the amount that condenses in the CAC. The entrainment and retention values may be determined empirically or modeled from the internal characteristics of the internal design of the CAC.

At 310, an algorithm may calculate the saturation vapor pressure at the CAC outlet as a function of the CAC outlet temperature and pressure. The algorithm then calculates the mass of water at this saturation vapor pressure at 312. Finally, the condensation formation rate at the CAC outlet is determined at 314 by subtracting the mass of water at the saturation vapor pressure condition at the CAC outlet and the retention value as determined by empirical determine lookup function or modeled form the internal design of the CAC from the mass of water in the ambient air. By determining the amount of time between condensate measurements at 316, method 300 may determine the amount of condensate within the CAC since a last measurement at 318. The current condensate amount in the CAC is calculated at 322 by adding the condensate value estimated at 318 to the previous condensate value and then subtracting any condensate losses since the last routine (that is, an amount of condensate removed. for example, via purging routines) at 320. Condensate losses may be assumed to be zero if the CAC outlet temperature was above the dew point. Alternatively, at 320, the amount of condensate removed may be modeled or determined empirically as a function of air mass, or the evaporation rate may be modeled if conditions exist for evaporation, and integrated down with each software task loop (that is, with each run of routine 300).

Turning to FIG. 4, graph 400 shows example adjustments to a coolant valve based on condensate formation in a CAC and CAC outlet temperature. Specifically, graph 400 shows changes in condensate formation at plot 402, changes in charge air temperature at the charge air outlet side of the CAC (e.g., CAC outlet temperature) at plot 404, changes in charge air temperature at the charge air inlet side of the CAC (e.g., CAC inlet temperature) at plot 406, changes in coolant valve position at plot 408, and changes in engine coolant temperature at plot 410. In this example, the coolant valve is movable between an open and closed position, the open position allowing heated engine coolant to flow from a cooling system to the inlet side of the CAC. In an alternate embodiment, the coolant valve may be adjustable between a plurality of positions to obtain different coolant flow rates through the CAC coolant line segment.

Prior to time t1, condensate formation in the CAC may be below a threshold, T1, (plot 402) and CAC outlet temperature may be below a threshold temperature, T2 (plot 404). As a result, the coolant valve may be closed (plot 408) and the CAC inlet temperature may be relatively low (plot 406). At time t1, condensate formation may reach threshold T1 while CAC outlet temperature remains below threshold temperature T2. Engine coolant temperature may be above threshold coolant temperature T3 (plot 410). In response to increased condensate formation, the controller may open the coolant valve at time t1, allowing heated coolant to circulate to the inlet side of the CAC. The CAC inlet temperature increases steadily after time t1 (plot 406) as a result of the heated coolant transferring heat to the incoming charge air. The CAC outlet temperature increases (plot 404) with the increasing temperature of the charge air at the inlet side of the CAC. As such, condensate formation decreases (plot 402) as the CAC outlet temperature increases.

At time t2, condensate formation decreases below threshold T1. In response, the controller may close the coolant valve to stop circulating heated coolant to the CAC. After the coolant valve closes, the CAC inlet temperature may decrease (plot 406). The CAC outlet temperature increases above threshold temperature T2 just after time t2 (plot 404); however, it begins to decrease slowly as CAC inlet temperature decreases. At time t3, condensate formation may increase above threshold T1 (plot 402). However, CAC outlet temperature may be greater than threshold temperature T2 at time t3 (plot 404). Thus, the coolant valve remains closed despite the increased condensate formation. At time t4, CAC outlet temperature decreases below threshold temperature T2 while condensate formation remains above threshold T1. Also at this time, engine coolant temperature remains above threshold coolant temperature T3. As a result, the coolant valve may open to circulate heated engine coolant to the inlet side of the CAC. After time t4, CAC inlet temperature increases (plot 406) and condensate formation decreases (plot 402). CAC outlet temperature begins to increase sometime after time t4, until it reaches threshold temperature T2 at time t5 (plot 404). In response to the CAC outlet temperature reaching threshold temperature T2, the coolant valve closes, cutting off heated engine coolant flow to the inlet side of the CAC.

At time t6, engine coolant temperature decreases below threshold coolant temperature T3 (plot 410). Since the coolant valve is closed at this time, the valve remains closed (plot 408). At time t7, condensate formation increases above threshold T1 (plot 402) while CAC outlet temperature is below threshold temperature T2. However, since engine coolant temperature is below threshold coolant temperature T3, the coolant valve remains closed and no engine coolant flows to the charge air inlet side of the CAC.

In this way, adjustments to a coolant valve are made in response to condensate formation in a CAC and CAC outlet temperature. During a first condition, shown at time t1 and time t4, the coolant valve is adjusted to deliver heated engine coolant to the charge air inlet side of the CAC. The first condition may include when condensate formation is greater than a threshold and charge air cooler outlet temperature is less than a threshold temperature. During a second condition, shown at time t2 and time t5, the coolant valve closes to stop delivery of heated engine coolant to the charge air inlet side of the CAC. The second condition may include one or more of when condensate formation is less than the threshold and charge air cooler outlet temperature is greater than the threshold temperature.

In this way, heat may be supplied to the inlet side of a CAC in order to reduce condensate formation and engine misfire. In one example, heat may be provided by heated engine coolant flowing through a coolant line segment at the charge air inlet side of the CAC. The delivery of heated engine coolant to the CAC may be controlled by adjusting a coolant valve positioned in the heated coolant line. The coolant valve may be opened to increase heating to the inlet side of the CAC in response to increased condensate formation. Alternatively, the coolant valve may be closed to decrease heating the inlet side of the CAC in response to increased charge air temperature at the CAC outlet. In this way, heating the inlet side of the CAC may be controlled to reduce condensate formation and engine misfire while also reducing the likelihood of knock.

Note that the example control routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and non-obvious combinations and subcombinations of the various systems and configurations, and other features, functions, and/or properties disclosed herein.

The invention claimed is:

1. A method for operating an engine, comprising:
adjusting, via an electronic controller, heating to a charge air inlet side of an air-to-air charge air cooler (CAC) by adjusting a valve coupled with the engine responsive to an operating condition to heat charge air flowing through the charge air inlet side of the air-to-air CAC with liquid coolant while ambient air flows across the air-to-air CAC to cool charge air flowing through the air-to-air CAC, the adjusting heating including increasing a temperature of the charge air entering the charge air inlet side of the air-to-air CAC in response to an increased condensate formation within the air-to-air CAC.

2. The method of claim 1, wherein the operating condition includes one or more condensate formation conditions in the air-to-air CAC, the method further comprising adjusting the heating in response to a charge air temperature at a charge air outlet side of the air-to-air CAC.

3. The method of claim 2, wherein the adjusting heating includes decreasing heating in response to the charge air temperature at the charge air outlet side of the air-to-air CAC reaching a threshold temperature.

4. The method of claim 3, further comprising decreasing heating in response to decreased condensate formation.

5. The method of claim 3, wherein the threshold temperature is based on engine knock.

6. The method of claim 1, further comprising adjusting the heating based on one or more of ambient humidity, ambient temperature, and pressure within the air-to-air CAC as an indication of condensate formation conditions.

7. The method of claim 1, wherein adjusting heating includes adjusting a delivery rate of heated engine coolant flowing from the engine upstream of a radiator to the charge air inlet side of the air-to-air CAC.

8. The method of claim 7, wherein the adjusting the delivery rate of heated engine coolant includes adjusting a coolant valve position of a coolant valve, where the coolant valve is positioned in a first coolant line, the first coolant line coupled to a second coolant line upstream of the radiator and downstream of the engine, the first coolant line transferring heat to incoming charge air, increasing the temperature of the charge air entering the charge air inlet side of the air-to-air CAC, and the second coolant line flowing heated engine coolant from the engine to the radiator.

9. The method of claim 8, wherein adjusting the coolant valve position includes increasing opening of the coolant valve as condensate formation increases and decreasing opening of the coolant valve as condensate formation decreases and a temperature at a charge air outlet side of the air-to-air CAC increases.

10. The method of claim 1, wherein adjusting heating includes adjusting an electric heat source operation.

11. The method of claim 1, wherein adjusting the heating to the charge air inlet side of the air-to-air CAC increases a temperature of the charge air flowing through the air-to-air CAC while ambient air cools the charge air flowing through and exiting the air-to-air CAC.

12. A method of controlling engine operation of an engine, comprising:
increasing, via an electronic controller, a flow of heated engine coolant flowing from the engine upstream of a radiator to a charge air inlet side of an air-to-air charge air cooler arranged in an engine intake passage downstream of a turbocharger compressor by adjusting an actuator coupled with the engine to heat charge air entering the charge air inlet side of the air-to-air charge air cooler while ambient air flows across the air-to-air charge air cooler to cool charge air flowing through the air-to-air charge air cooler, responsive to increased potential for condensate formation during engine coolant temperature above a threshold coolant temperature; and
not increasing, via the electronic controller, the flow of the heated engine coolant to the charge air inlet side of the air-to-air charge air cooler by adjusting the actuator during engine coolant temperature below the threshold coolant temperature.

13. The method of claim 12, wherein during the increasing and not increasing the flow of heated engine coolant, charge air flowing through the air-to-air charge air cooler is cooled via ambient air passing across the air-to-air charge air cooler, and wherein the threshold coolant temperature is based on a temperature of charge air entering the charge air inlet side of the air-to-air charge air cooler.

14. The method of claim 13, wherein the increasing the flow of engine coolant is further in response to charge air cooler outlet temperature.

15. The method of claim 13, further comprising adjusting a coolant valve to fully open to increase the flow, and maintaining the coolant valve fully closed to not increase the flow, wherein when the coolant valve is opened, heated engine coolant is delivered to the charge air inlet side of the air-to-air charge air cooler increasing the temperature of the charge air entering the charge air inlet side of the air-to-air charge air cooler, and when the coolant valve is closed, heated engine coolant is not delivered to the charge air inlet side of the air-to-air charge air cooler, wherein the coolant valve is disposed in a first coolant line fluidically coupled between a second coolant line and the charge air inlet side of the air-to-air charge air cooler, the second coolant line flowing heated engine coolant from the engine to the radiator.

16. The method of claim 15, wherein the coolant valve is opened when condensate formation is greater than a threshold and charge air cooler outlet temperature is less than a threshold temperature.

17. The method of claim 15, wherein the coolant valve is closed when one or more of condensate formation is less than a threshold and charge air cooler outlet temperature is greater than a threshold temperature.

18. The method of claim 15, wherein the coolant valve is closed when an air mass flow rate through the air-to-air charge air cooler is higher than a threshold rate.

19. A method of controlling engine operation of an engine, comprising:
while ambient air is flowing across an air-to-air charge air cooler arranged in an engine intake passage downstream of a turbocharger compressor to cool charge air flowing through the air-to-air charge air cooler:
during a first condition, including when condensate formation is greater than a threshold and charge air cooler outlet temperature is less than a threshold temperature, adjusting via an electronic controller a coolant valve to deliver heated engine coolant from a coolant line disposed between and flowing coolant from the engine to a radiator to a charge air inlet side of the air-to-air charge air cooler, increasing a temperature of charge air entering the charge air inlet side of the air-to-air charge air cooler while ambient air cools the charge air flowing through the air-to-air charge air cooler; and
during a second condition, different from the first, closing via the electronic controller the coolant valve to stop delivery of heated engine coolant to the charge air inlet side of the air-to-air charge air cooler while ambient air continues to cool the charge air flowing through the air-to-air charge air cooler.

20. The method of claim 19, wherein the second condition includes one or more of when condensate formation is less than the threshold, charge air cooler outlet temperature is greater than the threshold temperature, and an air mass flow rate through the air-to-air charge air cooler is higher than a threshold rate.

* * * * *